US012287862B2

(12) United States Patent
Vangipuram et al.

(10) Patent No.: US 12,287,862 B2
(45) Date of Patent: Apr. 29, 2025

(54) SYSTEMS, DEVICES, AND METHODS FOR DYNAMIC ALLOCATION

(71) Applicant: Infineon Technologies AG, Neubiberg (DE)

(72) Inventors: Sandeep Vangipuram, Bristol (GB); Glenn Farrall, Bristol (GB); Albrecht Mayer, Unterhaching (DE); Frank Hellwig, Wunstorf (DE)

(73) Assignee: Infineon Technologies AG, Neubiberg (DE)

(*) Notice: Subject to any disclaimer, the term of this patent is extended or adjusted under 35 U.S.C. 154(b) by 205 days.

(21) Appl. No.: 17/981,583

(22) Filed: Nov. 7, 2022

(65) Prior Publication Data

US 2023/0161862 A1 May 25, 2023

(30) Foreign Application Priority Data

Nov. 19, 2021 (DE) ..................... 10 2021 130 348.6

(51) Int. Cl.
*G06F 21/44* (2013.01)
*G06F 21/60* (2013.01)
(Continued)

(52) U.S. Cl.
CPC .............. *G06F 21/44* (2013.01); *G06F 21/60* (2013.01); *G06F 21/62* (2013.01); *G06F 21/71* (2013.01); *G06F 21/78* (2013.01)

(58) Field of Classification Search
CPC .......... G06F 21/44; G06F 21/53; G06F 21/60; G06F 21/62; G06F 21/71; G06F 21/78
See application file for complete search history.

(56) References Cited

U.S. PATENT DOCUMENTS 9,703,951 B2 * 7/2017 Patel ....................... G06F 21/53
2016/0092677 A1 * 3/2016 Patel ....................... G06F 21/53 726/23
2017/0116040 A1 * 4/2017 Cropper ................ G06F 9/5088

FOREIGN PATENT DOCUMENTS

CN 107851161 A * 3/2018 ......... G06F 12/1408
EP 917056 B1 * 1/2008 ............ G06F 11/203

OTHER PUBLICATIONS

"Assign a Virtual Machine to a Specific Processor"—VMWare Docs, VMWare, May 31, 2019 https://docs.vmware.com/en/VMware-vSphere/6.7/com.vmware.vsphere.resmgmt.doc/GUID-F40F901D-C1A7-43E2-90AF-E6F98C960E4B.html (Year: 2019).*

(Continued)

*Primary Examiner* — Randy A Scott
(74) *Attorney, Agent, or Firm* — Eschweiler & Potashnik, LLC

(57) ABSTRACT

A semiconductor chip includes an electronic hardware circuitry device that includes a plurality of partitionable hardware resources that each includes a corresponding resource allocation state. The electronic hardware circuitry includes a logic control circuit to control access to the plurality of hardware resources based on the respective resource allocation states of the hardware resources and based on input from one or more authorized agents. The semiconductor chip further includes a processor core to implement a plurality of software applications belonging to a first group or to a second group, each of the plurality of applications configured to access and interact with at least one corresponding hardware resource assigned to the respective application, implement assigning software agents each authorized and configured to cause the electronic hardware circuitry device to assign one or more unassigned hardware resources only to one or more of the software applications belonging to certain groups.

25 Claims, 3 Drawing Sheets

(51) Int. Cl.
*G06F 21/62* (2013.01)
*G06F 21/71* (2013.01)
*G06F 21/78* (2013.01)

(56) References Cited

OTHER PUBLICATIONS

"How to Use Azure Resource Groups for Better VM Management"—Jay Chapel, Medium, Apr. 10, 2020 https://jaychapel.medium.com/how-to-use-azure-resource-groups-for-better-vm-management-52fad7b3bcd1.*
Kernel (operating system); Wikipedia, the free encyclopedia. Published on Nov. 4, 2021.
Integrated circuit; Wikipedia, the free encyclopedia. Published Nov. 7, 2021.
Assign a Virtual Machine to a Specific Processor; VMware, Inc. Published May 31, 2019.

* cited by examiner

SYSTEMS, DEVICES, AND METHODS FOR DYNAMIC ALLOCATION

REFERENCE TO RELATED APPLICATIONS

This application claims priority to German Patent Application 10 2021 130 348.6, filed on Nov. 19, 2021. The contents of the above-referenced Patent Application is hereby incorporated by reference in its entirety.

TECHNICAL FIELD

Various embodiments generally relate to semiconductor devices including shared resources.

BACKGROUND

Semiconductor system or devices, including system-on-chips, can include several applications that are required to share resources. However, since software application tasks are developed by multiple different entities or companies, it can be disadvantageous to use static allocation of assignment of resources. However, dynamic allocation of resource to application software or software tasks may not be suitable in terms of ensuring safety and security of such system or devices.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the disclosure. In the following description, various embodiments of the disclosure are described with reference to the following drawings, in which.

DESCRIPTION

Figure 1:
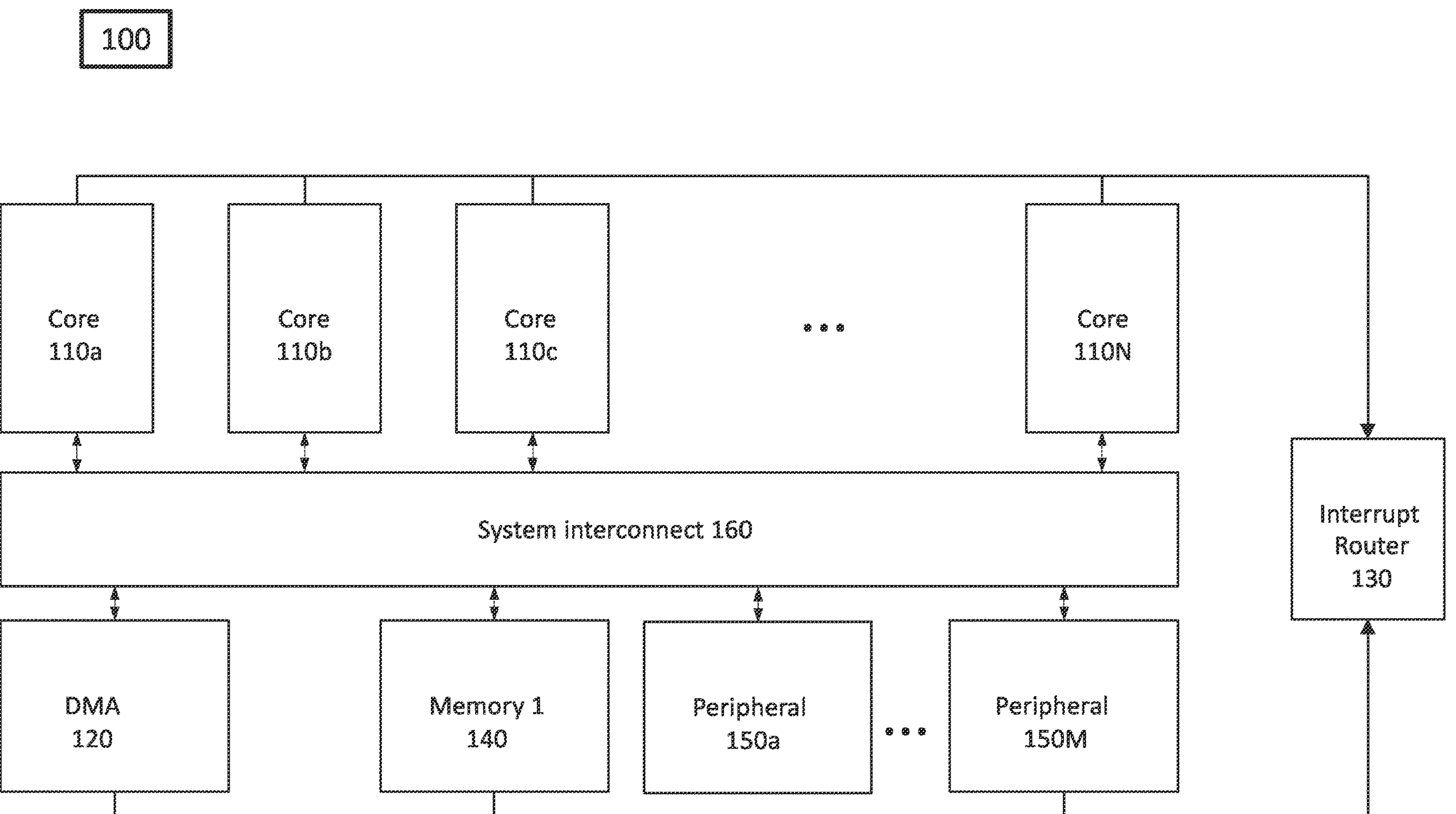
FIG. 1 includes a diagram illustrating a semiconductor device according to at least one exemplary embodiment of the present disclosure.

The following detailed description refers to the accompanying drawings that show, by way of illustration, specific details and embodiments in which the disclosure may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "processing circuitry" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Unless stated otherwise, a "circuit" as used herein is understood as any kind of logic-implementing entity, which may include special-purpose hardware. A circuit may thus be an analog circuit, digital circuit, mixed-signal circuit, logic circuit, integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit. A set of elements or a set of other circuits can be described herein, in which the term "set" can be interpreted as "one or more."

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure may be realized by one or more computers (e.g., computing devices, processors, processor cores, etc.) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a micro processing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the disclosure may be practiced.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "semiconductor substrate" or "semiconductor die" is defined to mean any construction comprising semiconductor material, for example, a silicon substrate with or without an epitaxial layer, a silicon-on-insulator substrate containing a buried insulator layer, or a substrate with a silicon germanium layer. The term "integrated circuits" as used herein refers to electronic circuits having multiple individual circuit elements, such as transistors, diodes, resistors, capacitors, inductors, and other active and passive semiconductor devices. A conductive region formed in and/or on the semiconductor substrate or semiconductor die is a portion of conductive routes and has exposed surfaces that may be treated by a planarization process, such as chemical mechanical polishing. Suitable materials for the conductive regions may include, but not limited to, for example copper, aluminum, copper alloy, or other mobile conductive materials. Copper interconnect level may be the first or any subsequent metal interconnect level of the semiconductor device.

FIG. 1 includes a diagram of an example of a semiconductor device 100. The semiconductor device may be a semiconductor chip, e.g., a single semiconductor chip including several hardware components that are configured to run or execute various tasks or applications. Further, the semiconductor chip may be implemented as a system-on-a-chip. That is, all features of the device 100 may be implemented as a single or common semiconductor substrate.

The semiconductor device 100 can include a plurality of processor cores, designated 110*a*-110N (where N is an arbitrary number). The device 100 can include a plurality of hardware peripheral devices. As shown in FIG. 1, the device 100 includes a direct memory access (DMA) controller 120, an interrupt controller 130, a memory or memory device 140, and other hardware peripherals designated 150*a*-150M.

Additionally, the device 100 can include a system interconnect 160 that couples to all or some of the components to allow the components to communicate with each other. The system interconnect 160 may be configured to distinguish between the various components, e.g., distinguish signals or communications between the different cores 110. As such, also signals or communications from the different types or kinds of software applications can also be distinguished using the system interconnect 160.

Other connections between the components of the device 100 may be present, although are not depicted in FIG. 1.

According to exemplary embodiments of the present disclosure, the semiconductor device 100 may be a system-on-chip configured to implement or execute multiple applications. More specifically, the one or more processor cores 110*a*-110N or processor cores 110 may execute or implement the applications. The processor cores 110 may execute program instructions, which can be stored on the memory 140 or other suitable component, to execute multiple applications.

In some cases, the semiconductor device 100 may implement safety-related applications which may be designed to operate according to one or more safety standards or protocols. Further, the device 100 may also implement security-based or security-related applications. The security-related applications may include or implement software tasks such as authentication, encryption, key provisioning, and the like to name a few.

The different types of software applications (e.g., the safety and the security related applications) implemented by the device 100 may be developed by different entities or companies. As such, the software applications do not trust each other in a sense and may be not designed to work with each other when executed by the cores 110 on the device 100. The multiple applications operating on the device 100 may require access and use the some of the same resources, e.g., the interrupt controller, the DMA, etc. in order to carry out the intended functionalities of the applications and the device 100. The hardware of embodiments of the disclosure allows multiple software applications to take control of shared hardware resources without requiring an overarching hardware or software instance that can assign and control resources. In the case that no single hardware or software instance is able to control different software application groups, the hardware proposed allows resources to be correctly and reliably assigned even without such a common assigning agent.

According to at least one exemplary embodiment of the present disclosure, the applications executed or running on the processor cores 110 of the semiconductor device 100 may be considered as different groups. In one example, the software applications are grouped into safety/non-security applications or grouped into security applications. As such, the semiconductor device 100 may be configured to allow safety software applications to be free from interference from security software applications and vice versa. The security applications may have not been developed according to the same safety standards and further configured so that a security application software task must be guaranteed confidentiality, integrity against interference, and the ability to prevent spoofing from a non-security application software task which has not been developed according to the same security standards. That is, the semiconductor device 100 may operate to protect one group of applications from interfering with another group of applications and vice versa, especially with respect to the shared resources.

In at least one exemplary embodiment, the differently grouped applications or software assigning agents described herein may be executed or implemented separately from each other, for example they may be implemented in separate partitions. The hardware partitions may be realized or implemented in several ways. The hardware partitions can reflect or correspond to a division of hardware implementing the applications. In one case, the partitions may be virtual machines, which are implemented by the cores 110. That is, the cores 110 may execute a hypervisor to implement a plurality of virtual machines. The virtual machines can execute or implement the multiple software applications. The software applications/agents of one group (e.g., the safety applications) may be executed on virtual machines that are different from the virtual machines that execute the software applications/agents of another group (e.g., security applications.)

In another example, the cores 110 may be partitioned or used in a partitioned manner. In such a case, one or more cores may (only) execute one group of software applications (e.g., safety applications) while another, different group of one or more cores 110 may (only) execute another group of software applications.

In yet another case, partitioning may be realized within the cores 110. A single core 110 may be divided into several (e.g., logical) partitions. Further the one or more partitions may be configured to only execute software applications or agents from a particular group (e.g., safety) while another or different one or more partitions may be configured to only software applications/agents from another group of software applications/agents (e.g., security).

Further, for the device 100 to ensure freedom of interference between the groups of applications, e.g., the safety applications and the security applications, to one or more of the system or device peripherals, e.g., the DMA, the interrupt controller, etc. may be partitionable. That is, the resources of some of the device peripherals may be partitioned and assignable, at least temporarily, to certain application or component.

Figure 2:
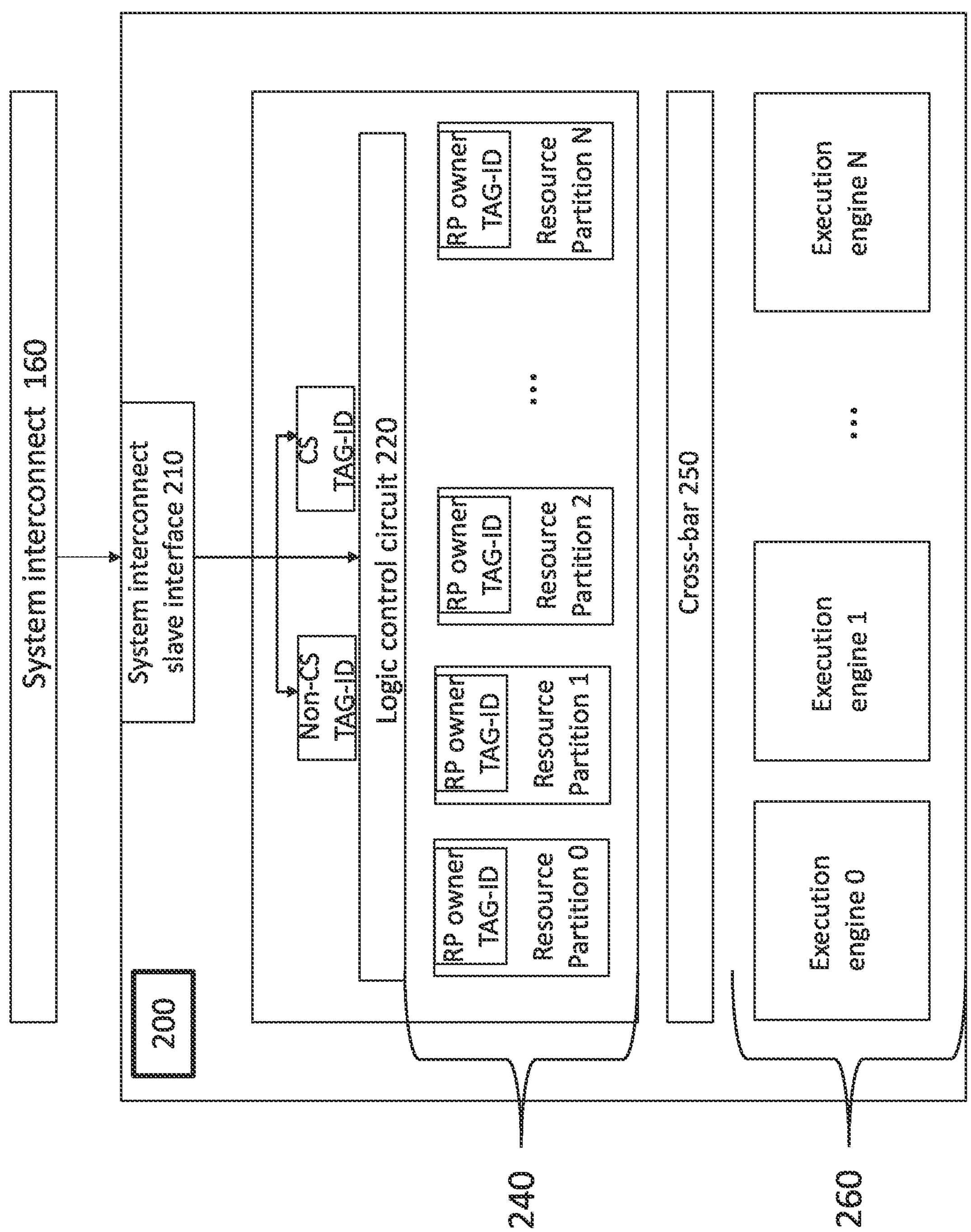
FIG. 2 includes diagram illustrating a hardware peripheral device according to at least one exemplary embodiment of the present disclosure.

FIG. 2 shows is a diagram of an exemplary electronic hardware circuitry device 200. Referring to FIG. 1, the electronic hardware circuitry device 200 may be the DMA 120, the interrupt controller 130, or can be any other suitable peripheral device. The peripheral device or an electronic hardware circuitry device 200 may be a hardware system device including resources that are capable of being partitioned. The electronic hardware circuitry device 200 may include an interface 210, such a slave interface for communicating with other components.

Additionally, in the example of FIG. 2, the electronic hardware circuitry device 200 resources 240 can be partitioned, e.g., into up to N resource partitions (RPs). Each resource or resource partition may be a hardware circuit component or circuitry of the electronic hardware circuitry device 200 that is configured to interface with the executing aspects or execution engines 260 of the electronic hardware circuitry device 200. Each resource partition can have a configuration indicating or dictating how the resource partition interfaces with the execution engines 260. The configuration can specify how data received by the partition is to be used with the execution engines.

The resources or resource partitions RPs 240 can be selectively or dynamically assigned, e.g., to software applications. The assigned software application can be referred to or considered the owner of the resource partition (RP). The application owner may use the resource partition to accomplish one or more software tasks. For example, the application can modify or specify the configuration of the resource partition. Thus, the resource partition 240 can include a storage element component, e.g., one or more registers, which can indicate the configuration. Further the storage element can indicate whether the application has been assigned and, if so, its owner, or can indicate that it is unassigned.

The logic control circuit 220 can be responsible for controlling access as well as for partitioning and assigning owners to the hardware resource partitions 240. Further the logic control circuit 220 can be responsible or configured to control access to the hardware resources. For example, the logic control circuit 220 can be configured to provide or deny access to the one or more of the plurality of hardware resources.

The logic control circuit 220 may be a hardwired electronic component. In other words, the logic control circuit 220 as realized may be permanent physical components, and not capable of being electronically reconfigured or reprogrammed altered in terms of its operations. As such, the operations or rules governing how the logic control circuit 220 operates are embedded in the physical circuitry components (e.g., transistors) and cannot be changed.

Each resource or resource partition can be associated with or include an allocation state. In one example the allocation state or allocation state data can indicate whether the resource or resource partition has been assigned (e.g., to an owner) or is unassigned (e.g., free). The allocation state or allocation state data can further indicate the owner(s) of each of the assigned resource partitions. The allocation state data for each resource partition may be stored in any suitable format, such as, stored in one or more registers.

Initially or after a reset performed by the hardware electronic circuitry device, the resource allocation states of each of the resources or resource partitions can be updated or changed to unassigned. For example, the logic control circuit 220 can be configured to change the assignment status or the resource allocation status to unassigned in response to a system reset.

According to exemplary embodiments of the present disclosure, the logic control circuit 220 can be configured to write or specify the resource allocation state. For example, in response to a reset (e.g., initiated by the semiconductor device 200), the logic control circuit 220 can set or change the resource allocation states of each of the resource partitions to unassigned (e.g., no owner).

In addition, the logic control circuit 220 can also be configured to set or specify the resource allocation state in response to requests, instructions, or communications from authorized entities. For example, the logic control circuit 220 can be configured to change an unassigned resource partition to be assigned to a particular owner in response to a request, instructions, (e.g., signals) from authorized entities, applications or agents.

In at least one exemplary embodiment of the present disclosure, the device 100 may implement agents, e.g., software or master assigning agents. These assigning agents are configured to assign, e.g., using the logic control circuit 220, an owner to unassigned or unallocated resources/resource partitions of the electronic hardware circuitry device 200. These assigning agents can be implemented or executed by the one or more cores 110 and may be partitioned or segregated as explained above, e.g., on separate cores, virtual machines, etc.

The logic control circuit 220 of the electronic hardware circuitry device 200 can be configured to only allow these assigning agents to assign or map the unassigned resource partitions 240 to specified owners e.g., software applications. The cores 110 may execute multiple software assigning agents with each configured to assign the hardware resources or resource partitions 240 to an application belonging to a particular group or type of applications. That is, an assigning agent may be restricted or configured to only assign one type or group of applications to unassigned resource partitions 240. The system interconnect 160 can be configured to provide the communications or requests (e.g., in the form of signals) in such a manner to allow the electronic hardware circuitry 200 and the logic control circuit 220 to distinguish between the different types of applications of different software agents.

In at least one instance, the system interconnect 160 may provide communications or requests from certain applications or cores 110 on certain or predefined connections. These connections may be configured so that the communications are provided to specific or known ports or inputs of the electronic hardware circuitry device 200. As a result, the electronic hardware circuitry device 200 can know the components or cores from which the request or communications originate. This information can be used to help verify the originator of the request or communication, e.g., the group from which the application or software agent belongs to. For example, a request received on certain inputs may be known be from a certain software agent (e.g., security software agent).

In addition, the requests or communications (e.g., signals) by each type of application or software agent may include an identification or transaction identification (TAG-ID). The TAG-ID can also be used to by the electronic hardware circuitry device 200 to verify/identify the type or specific software agent interacting or requesting access to the electronic hardware circuitry device 200. Based on the verification or identification, the electronic hardware circuitry device 200 provides access. The TAG-IDS may be uniquely appointed to the software applications or agents. Further, the TAG-IDS may be statically appointed, or in other cases may be dynamically appointed.

Accordingly, the TAG-IDS can provide or be a mapping between the hardware, e.g., the cores, virtual machines, applications, or agents, etc. and the hardware resource partitions (RPs).

In at least one example, the device 100 can implement a security software/master agent and a non-security or safety software/master agent, which can be executed by the cores 110. Moreover, the cores 110 may also execute multiple applications that can be categorized or identified as either a security application or a non-security/safety application. The logic control circuit 220 can obtain/receive requests or instructions, e.g., in the form of signals, from each of the master agents. A reset notwithstanding, the logic of the logic control circuit 220 can only allow these authorized software agents to allocate or assign unassigned resource partitions to applications. That is, the logic control circuit 220 allows the security software agent and non-security/safety software agent each to only assign an owner to unassigned hardware resources. Further, the logic of the logic control circuit 220 can only allow or ensure with the security and non-security software agents to assign the unassigned resource partition to their respective group. The TAG-ID can be used by the logic control circuit 220 for implementing the logic or rules.

In response to a valid command or request from a software agent, the logic control circuit 220 updates the resource allocation status of the unassigned resource to reflect a valid ownership assignment. As such, the resource allocation status of the previously unassigned resource partition is updated by the logic control circuit 220 to "assigned" and the owner of the resource partition is further specified. Further, a resource owner transaction identification or "RP owner TAG-ID" can be specified in the request to identify the assigned owner and can also indicate the group or type of application that is the assignee or application owner of the resource partition.

After an assignment of a resource partition, the logic control circuit 220 uses the allocation status data to control further access to the resource partition. Specifically, after the assignment of a resource partition, the logic control circuit 220 may only allow the specified application owner to control or interface with the resource partition. In particular, the logic control circuit 220 may only allow the specified or assigned application owner to relinquish the resource partition. That is, the logic control circuit 220 is configured to only accept a request or instruction from the assigned application owner to free up the resource partition and change its allocation status to unassigned.

The logic control circuit 220 can be further configured to only allow the assigned owner access to the resource partition 240. In one example, the logic control circuit 220 can be configured to allow the currently assigned resource owner to give or relinquish ownership of the currently assigned resource. That is, the logic control circuit 220 may only respond to requests or commands (e.g., signals) sent from the owner of the assigned resource partition (e.g., application owner) to free and change the resource allocation status to unassigned. Other components or applications are unauthorized to cause the resource partition to become unassigned. In such cases, requests or attempts by unauthorized components (e.g., requests by applications not specified as owner) to free resources (change the allocation status to "unassigned") will be denied or ignored by the logic control circuit 220.

Applications that are specified as the assigned owner of a resource partition can access the resource partition, through the logic control circuit 220 and can configure the resource partition. For instance, the application owner may configure or specify the data moves or the how data provide to the resource partition is be processed or utilized by the logic control circuit 220. The resource partitions 240 can each access (via a cross-bar switch 250) the execution engines 260 of the electronic hardware circuitry 200.

The execution engines 260 can perform certain tasks or processing according to the configuration specified in the resource partition. For example, in the case where the electronic hardware circuitry device 220 is a DMA controller, the execution engines can be configured to perform DMA controller tasks. In the case where the electronic hardware circuitry device 220 is an interrupt controller, the execution engines can be configured to perform certain interrupt routines.

The resource partitions 240 may individually access the execution engines 260, e.g., using the cross-bar switch 250, in a time-slice manner. Other peripheral devices can be realized and the electronic hardware circuitry device 200 may be adapted or modified accordingly to operate accordingly to the embodiments described herein.

While in various examples the semiconductor device 100 has been described implementing two groups of applications, e.g., security and non-security applications, this is merely exemplary as the number or type of application groups and corresponding software assigning agents can be vary.

Figure 3:
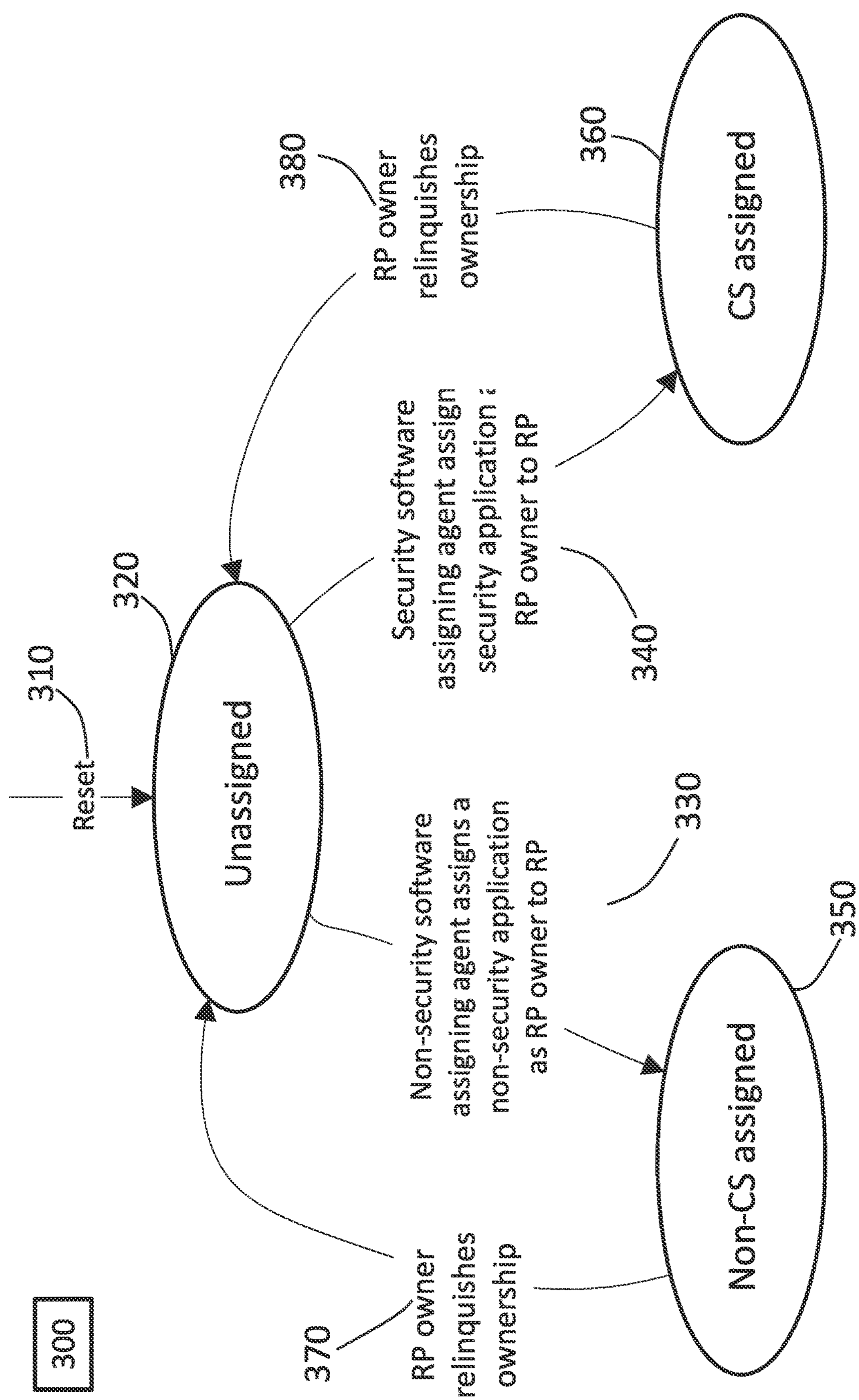
FIG. 3 includes a state diagram of a resource partition according to at least one exemplary embodiment of the present disclosure.

FIG. 3 shows a state diagram 300 showing the possible states for a resource partition (RP) of electronic hardware circuity devices described herein. In the example of FIG. 3, the resource partition (RP) may operate in a semiconductor device such as the semiconductor device 100. Thus, the semiconductor device includes cores 110 that implement multiple software applications. In this example, the software applications are either one of two different application group or types, namely security applications or non-security applications.

Further the cores 110 implement two software assigning agents, a security assigning software agent and a non-security software assigning agent. As shown, at initial or reset event 310 the resource partition (RP) transitions to the unassigned state 320 and becomes unassigned without an owner. In this unassigned state 320, the RP can transition into one of two possible states. In one case, transition 330 occurs when a non-security software assigning agent assigns a non-security application as the owner of the resource partition RP. As such, the RP transitions to a non-security assigned state 350. In the other case, the transition 340 occurs when a security software assigning agent assigns a security application as the owner of the resource partition RP. As such, the RP transitions to a security assigned state 360. As shown and described in embodiments, herein, each software assigning agent can only assign an application that belongs to a particular group of applications. In this example, the non-security software assigning agent can only assign a non-security software application as owner of a resource partition RP, and the security software assigning agent can only assign a security software application as owner of a resource partition RP.

The resource partition RP remains in the assigned state, e.g., either non-security assigned state 350 or security assigned state 360 until the current assigned application owner relinquishes or gives up ownership as explained in embodiments herein. Transition 370 occurs when the current resource partition owner, a non-security application, relinquishes ownership. As such, the resource partition transitions from non-security assigned state 350 back to unassigned state 320. Similarly transition 380 occurs when the current resource partition owner, a security application relinquishes ownership. As such, the resource partition transitions from non-security assigned state 360 back to unassigned state 320.

In other cases, the state diagram 300 can be appropriately modified, mutatis mutandis, for different variations of the semiconductor device, wherein the number of application groups and software assigning agents are changed, e.g., increased, mutatis mutandis.

The following examples pertain to further aspects of this disclosure:

Example 1 is a semiconductor chip including:

a. at least one electronic hardware circuitry device including: a plurality of hardware resources, the plurality of hardware resources being partitionable and each hardware resource including a corresponding resource allocation state indicating whether the respective hardware resource is assigned or unassigned and indicating an assigned application owner if assigned; a logic control circuit to control access to the plurality of hardware resources comprising the logic control circuit configured to: provide or deny access to the one or more of the plurality of hardware resources based on the respective resource allocation states of the hardware resources, and specify the resource allocation state for each of the hardware resources based on input from one or more authorized agents;

b. a memory comprising program instructions; and c. at least one processor core coupled to the memory and coupled to the at least one electronic hardware circuitry device, the at least one processor configured to execute the program instructions so as to: implement a plurality of software applications belonging to a first group or to a second group, each of the plurality of applications configured to access and interact with at least one corresponding hardware resource assigned to the respective application, implement a first assigning software agent authorized and configured to cause the electronic hardware circuitry device to assign one or more unassigned hardware resources only to one or more of the software applications belonging to the first group, and implement a second assigning software agent authorized and configured to cause the electronic hardware circuitry device to assign one or more unassigned hardware resources only to one or more of the applications belonging to the second group, wherein for each assigned hardware resource, the logic control circuit is further configured to only allow a requesting software application to cause a relinquishment of ownership over an assigned hardware resource if the requesting software application is the currently assigned application of the hardware resource.

Example 2 is the subject matter of Example 1, wherein the first assigning software agent and the second assigning software agent may be implemented on separate partitions by the at least one processor core.

Example 3 is subject matter of Example 2, wherein the at least one processor core may be configured to implement a plurality of virtual machines, and wherein the first assigning software agent and the second assigning software agent implemented on separate partitions comprise the first assigning software agent implemented on a first virtual machine of the plurality of virtual machines and the second assigning software agent implemented on a second virtual machine of the plurality of virtual machines.

Example 4 is the subject matter of Example 2, wherein the at least one processor cores may include a plurality of processor cores, and wherein the first assigning software agent and the second assigning software agent implemented on separate partitions comprises the first assigning software agent is implemented on a first processor core of the plurality of processor cores and the second assigning software agent is implemented on a second processor core of the plurality of processor cores.

Example 5 is the subject matter of Example 2, wherein the first assigning software agent and the second assigning software agent may be implemented on a single processor core, the single processor core comprising a plurality of processor partitions, wherein the first assigning software agent is implemented on a first processor partition of the plurality of processor partitions and the second assigning software agent is implemented on a second processor partition of the plurality of processor partitions.

Example 6 is the subject matter of any of claims 2 to 5, wherein the software applications belonging to the first group and the applications belonging to the second group are respectively may be implemented on separate partitions provided by the at least one core.

Example 7 is the subject matter of any of the preceding Examples, wherein the logic control circuit may be configured to only allow the first assigning software agent to assign one or more of the unassigned hardware resources to one or more of the plurality of software applications belonging to the first group, and configured to only allow the second assigning software agent to assign one or more of the unassigned hardware resources to one or more of the plurality of software applications belonging to the second group.

Example 8 is the subject matter of any of the preceding claims, wherein to assign the unassigned resources of the electronic hardware circuitry device, the first and second assigning software agents are may each be configured to request access to one or more of the unassigned hardware resources using one or more unique transaction identification code.

Example 9 is the subject matter of any of the preceding claims, wherein the logic control circuit may be configured to provide access to the one or more of the unassigned hardware resources to the first or second software assigning agents by verifying the one or more unique transaction identification codes provided by the first or second assigning software agents.

Example 10 is the subject matter of Example 8 or 9, wherein the one or more unique transaction identification codes can indicate a mapping of the first or second assigning software agent to one or more partitions implemented by the at least one processor core.

Example 11 is the subject matter of any of the preceding Examples, wherein for each assigned hardware resource, the logic control circuit may be further configured to only allow a corresponding currently assigned software application to access the hardware resource.

Example 12 is the subject matter of any of the preceding Examples, wherein for each assigned hardware resource, the corresponding application may be configured to access the assigned hardware resource by providing one or more unique transaction identification codes identifying the application, and wherein the logic control circuit is configured to verify the corresponding software application based on the one or more transaction identification codes to provide access to the assigned hardware resource.

Example 13 is the subject matter of any of the preceding claims, wherein for each assigned hardware resource, the logic control circuit can be further configured to only allow a corresponding currently assigned software application to specify a data movement or processing configuration in the hardware resource.

Example 14 is the subject matter of any of the preceding Examples, wherein at least one electronic hardware circuitry device can include a plurality of execution engines, each execution engine comprising circuitry to perform one or more tasks.

Example 15 is the subject matter of Example 14, wherein each of the hardware resources can be coupled to and configured to interface with the execution engines in a time-slice manner.

Example 16 is the subject matter of any of the preceding Examples, wherein the at least one electronic hardware circuitry device can further include an interrupt controller, and wherein the hardware resources includes a plurality of interrupts.

Example 17 is the subject matter of any of the preceding Examples, wherein the at least one electronic hardware circuitry can include a direct memory access (DMA) controller, and wherein the hardware resources can include a plurality of DMA channels.

Example 18 is the subject matter of any of the preceding Examples, wherein each of the hardware resources comprises one or more registers indicating its respective resource allocation state and indicating a respective data configuration.

Example 19 is the subject matter of any of the preceding Examples, which can further include: a system interconnect coupled to the at least one electronic hardware circuitry, the memory, and the at least processor core.

Example 20 is the subject matter of Example 19, wherein the system interconnect can be configured to provide the connections between the electronic hardware circuitry device and the at least one core so that the electronic hardware circuitry device distinguishes between communications from the first assigning software agent and the second assigning software agent.

Example 21 is the subject matter of any of the preceding Examples, wherein the logic control circuit can be a hardwired hardware component.

Example 22 is the subject matter of any of the preceding Examples, wherein the semiconductor chip can be a system-on-a chip designed chip.

Example 23 is the subject matter of any of the preceding Examples, wherein at least one software application of the first group is a security-related software application configured to perform one or more security related software tasks.

Example 24 is the subject matter of any of the preceding Examples, wherein at least one software application of the second group is a safety-related software applications implemented according to one or more predefined safety standards.

Example 25 is the subject matter of any of the preceding Examples, wherein the at least one electronic hardware circuitry device is configured to perform a reset of the hardware resources so as to cause the resource allocation states of each of the hardware resources to be unassigned.

Example 26 is a non-transitory computer readable medium including instructions configured to be executed by at least one processor of at least one electronic hardware circuitry device, the hardware circuity device including a plurality of hardware resources, the plurality of hardware resources being partitionable and each hardware resource including a corresponding resource allocation state indicating whether the respective hardware resource is assigned or unassigned and indicating an assigned application owner if assigned; a logic control circuit to control access to the plurality of hardware resources comprising the logic control circuit configured to: provide or deny access to the one or more of the plurality of hardware resources based on the respective resource allocation states of the hardware resources, and specify the resource allocation state for each of the hardware resources based on input from one or more authorized agents, wherein the instructions when executed cause the at least one processor of the at least one electronic hardware circuitry device to implement a plurality of software applications belonging to a first group or to a second group, each of the plurality of applications configured to access and interact with at least one corresponding hardware resource assigned to the respective application, implement a first assigning software agent authorized and configured to cause the electronic hardware circuitry device to assign one or more unassigned hardware resources only to one or more of the software applications belonging to the first group, and implement a second assigning software agent authorized and configured to cause the electronic hardware circuitry device to assign one or more unassigned hardware resources only to one or more of the applications belonging to the second group, wherein for each assigned hardware resource, the logic control circuit is further configured to only allow a requesting software application to cause a relinquishment of ownership over an assigned hardware resource if the requesting software application is the currently assigned application of the hardware resource.

It should be noted that one or more of the features of any of the examples above may be suitably or appropriately combined with any one of the other examples.

The foregoing description has been given by way of example only and it will be appreciated by those skilled in the art that modifications may be made without departing from the broader spirit or scope of the disclosure as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A semiconductor chip comprising:

at least one electronic hardware circuitry device comprising:

a plurality of hardware resources, the plurality of hardware resources being partitionable and each hardware resource including a corresponding resource allocation state indicating whether that hardware resource is assigned or unassigned and indicating an assigned application owner for that hardware resource when assigned; and a logic control circuit to control access to the plurality of hardware resources, the logic control circuit configured to:

provide or deny access to one or more of the plurality of hardware resources based on the respective resource allocation states of the hardware resources, and specify the resource allocation state for each of the hardware resources based on input from one or more authorized agents;

a memory comprising program instructions;

a plurality of execution engines, each execution engine comprising circuitry to perform one or more tasks, wherein each of the hardware resources is:

coupled to the execution engines via a cross-bar switch; and configured to interface with the execution engines in a time-slice manner; and at least one processor core coupled to the memory and coupled to the at least one electronic hardware circuitry device, the at least one processor core configured to execute the program instructions to:

implement a plurality of software applications belonging to a first group or to a second group, each of the plurality of software applications configured to access and interact with at least one corresponding hardware resource assigned to the respective software application, implement a first assigning software agent authorized and configured to cause the electronic hardware circuitry device to assign one or more unassigned hardware resources only to one or more of the software applications belonging to the first group, and implement a second assigning software agent authorized and configured to cause the electronic hardware circuitry device to assign one or more unassigned hardware resources only to one or more of the software applications belonging to the second group, wherein for each assigned hardware resource, the logic control circuit is further configured to only allow a requesting software application to cause a relinquishment of ownership over an assigned hardware resource when the requesting software application is a currently assigned application of the hardware resource.

2. The semiconductor chip of claim 1, wherein the first assigning software agent and the second assigning software agent are implemented on separate partitions by the at least one processor core.

3. The semiconductor chip of claim 2, wherein the at least one processor core is configured to implement a plurality of virtual machines, and wherein the first assigning software agent and the second assigning software agent implemented on separate partitions comprise the first assigning software agent implemented on a first virtual machine of the plurality of virtual machines and the second assigning software agent implemented on a second virtual machine of the plurality of virtual machines.

4. The semiconductor chip of claim 2, wherein the at least one processor core comprises a plurality of processor cores, and wherein the first assigning software agent and the second assigning software agent implemented on separate partitions comprises the first assigning software agent is implemented on a first processor core of the plurality of processor cores and the second assigning software agent is implemented on a second processor core of the plurality of processor cores.

5. The semiconductor chip of claim 2, wherein the first assigning software agent and the second assigning software agent are implemented on a single processor core, the single processor core comprising a plurality of processor partitions, and wherein the first assigning software agent is implemented on a first processor partition of the plurality of processor partitions and the second assigning software agent is implemented on a second processor partition of the plurality of processor partitions.

6. The semiconductor chip of claim 2, wherein the software applications belonging to the first group and the software applications belonging to the second group are respectively implemented on separate partitions provided by the at least one processor core.

7. The semiconductor chip of claim 1, wherein the logic control circuit is configured to only allow the first assigning software agent to assign one or more of the unassigned hardware resources to one or more of the plurality of software applications belonging to the first group, and configured to only allow the second assigning software agent to assign one or more of the unassigned hardware resources to one or more of the plurality of software applications belonging to the second group.

8. The semiconductor chip of claim 1, wherein to assign the unassigned hardware resources of the electronic hardware circuitry device, the first and second assigning software agents are each configured to request access to one or more of the unassigned hardware resources using one or more unique transaction identification codes.

9. The semiconductor chip of claim 8, wherein the logic control circuit is configured to provide access to the one or more of the unassigned hardware resources to the first or second assigning software agents by verifying the one or more unique transaction identification codes provided by the first or second assigning software agents.

10. The semiconductor chip of claim 8, wherein the one or more unique transaction identification codes indicates a mapping of the first or second assigning software agent to one or more partitions implemented by the at least one processor core.

11. The semiconductor chip of claim 1, wherein for each assigned hardware resource, the logic control circuit is further configured to only allow a corresponding currently assigned software application to access the assigned hardware resource.

12. The semiconductor chip of claim 1, wherein for each assigned hardware resource, the corresponding assigned software application is configured to access the assigned hardware resource by providing one or more unique transaction identification codes identifying the assigned software application, and wherein the logic control circuit is configured to verify the corresponding assigned software application based on the one or more unique transaction identification codes to provide access to the assigned hardware resource.

13. The semiconductor chip of claim 1, wherein for each assigned hardware resource, the logic control circuit is further configured to only allow a corresponding currently assigned software application to specify a data movement or processing configuration in the hardware resource.

14. The semiconductor chip of claim 1, wherein the at least one electronic hardware circuitry device comprises an interrupt controller, and wherein the hardware resources comprise a plurality of interrupts.

15. The semiconductor chip of claim 1, wherein the at least one electronic hardware circuitry comprises a direct memory access (DMA) controller, and wherein the hardware resources comprise a plurality of DMA channels.

16. The semiconductor chip of claim 1, wherein each of the hardware resources comprises one or more registers indicating its respective resource allocation state and indicating a respective data configuration.

17. The semiconductor chip of claim 1, further comprising:

a system interconnect coupled to the at least one electronic hardware circuitry, the memory, and the at least one processor core.

18. The semiconductor chip of claim 17, wherein the system interconnect is configured to provide connections between the electronic hardware circuitry device and the at least one processor core so that the electronic hardware circuitry device distinguishes between communications from the first assigning software agent and the second assigning software agent.

19. The semiconductor chip of claim 1, wherein the logic control circuit is a hardwired hardware component.

20. The semiconductor chip of claim 1, wherein the semiconductor chip is a system-on-a chip design.

21. The semiconductor chip of claim 1, wherein at least one software application of the first group is a security-related software application configured to perform one or more security related software tasks.

22. The semiconductor chip of claim 1, wherein at least one software application of the second group is a safety-related software application implemented according to one or more predefined safety standards.

23. The semiconductor chip of claim 1, wherein the at least one electronic hardware circuitry device is configured to perform a reset of the plurality of hardware resources so as to cause the resource allocation states of the respective hardware resources to be unassigned.

24. A semiconductor chip comprising:

at least one electronic hardware circuitry device comprising:

a plurality of hardware resources, the plurality of hardware resources being partitionable and each hardware resource including a corresponding resource allocation state indicating whether that hardware resource is assigned or unassigned and indicating an assigned application owner for that hardware resource when assigned; and a logic control circuit to control access to the plurality of hardware resources, the logic control circuit configured to:

provide or deny access to one or more of the plurality of hardware resources based on the respective resource allocation states of the hardware resources, and specify the resource allocation state for each of the hardware resources based on input from one or more authorized agents;

a memory comprising program instructions; and at least one processor core coupled to the memory and coupled to the at least one electronic hardware circuitry device, the at least one processor core configured to execute the program instructions to:

implement a plurality of software applications belonging to a first group or to a second group, each of the plurality of software applications configured to access and interact with at least one corresponding hardware resource assigned to the respective software application, wherein at least one software application of the second group is a safety-related software application implemented according to one or more predefined safety standards, implement a first assigning software agent authorized and configured to cause the electronic hardware circuitry device to assign one or more unassigned hardware resources only to one or more of the software applications belonging to the first group, and implement a second assigning software agent authorized and configured to cause the electronic hardware circuitry device to assign one or more unassigned hardware resources only to one or more of the software applications belonging to the second group, wherein for each assigned hardware resource, the logic control circuit is further configured to only allow a requesting software application to cause a relinquishment of ownership over an assigned hardware resource when the requesting software application is a currently assigned application of the hardware resource.

25. The semiconductor chip of claim 24, wherein at least one software application of the first group is a security-related software application configured to perform one or more security related software tasks.

* * * * *